(12) United States Patent
Cagnac et al.

(10) Patent No.: US 12,715,698 B2
(45) Date of Patent: Aug. 25, 2026

(54) TRANSFER TABLE

(71) Applicant: EXOTEC PRODUCT FRANCE, Croix (FR)

(72) Inventors: Bastien Cagnac, Wasquehal (FR); Léa Niboulies, Lille (FR); Franck Khier, Lille (FR)

(73) Assignee: EXOTEC PRODUCT FRANCE, Croix (FR)

( * ) Notice: Subject to any disclaimer, the term of this patent is extended or adjusted under 35 U.S.C. 154(b) by 91 days.

(21) Appl. No.: 18/653,203

(22) Filed: May 2, 2024

(65) Prior Publication Data

US 2024/0367910 A1 Nov. 7, 2024

(30) Foreign Application Priority Data

May 3, 2023 (FR) ...................................... 2304427

(51) Int. Cl.
*B65G 13/10* (2006.01)
*B65G 47/54* (2006.01)

(52) U.S. Cl.
CPC ............. *B65G 13/10* (2013.01); *B65G 47/54* (2013.01); *B65G 2207/18* (2013.01)

(58) Field of Classification Search
None
See application file for complete search history.

(56) References Cited

U.S. PATENT DOCUMENTS 10,882,703 B2 * 1/2021 Phillips .................. B65G 43/08
11,318,155 B2 * 5/2022 Dickey ................ A61K 31/366
2018/0319605 A1 11/2018 Itoh et al.

FOREIGN PATENT DOCUMENTS

JP 6140467 B2 5/2017

OTHER PUBLICATIONS

Search Report issued on Nov. 6, 2023, in corresponding French Application No. 2304427, 18 pages.

* cited by examiner

*Primary Examiner* — Kavel Singh
(74) *Attorney, Agent, or Firm* — Maier & Maier, PLLC

(57) ABSTRACT

A transfer table including a first conveyor assembly defining a first plane for conveying articles; a second conveyor assembly defining a second plane for conveying articles; and a raising-lowering mechanism for the first and/or second assemblies, the raising-lowering mechanism including a cam having a track and a pair of rollers respective to the conveyor assemblies and engaging with the track, and the cam is mobile by a pivoting motion between: a first position, in which the first plane is arranged above the second plane; and a second position, in which the second plane is arranged above the first plane.

15 Claims, 3 Drawing Sheets

[Fig. 1]
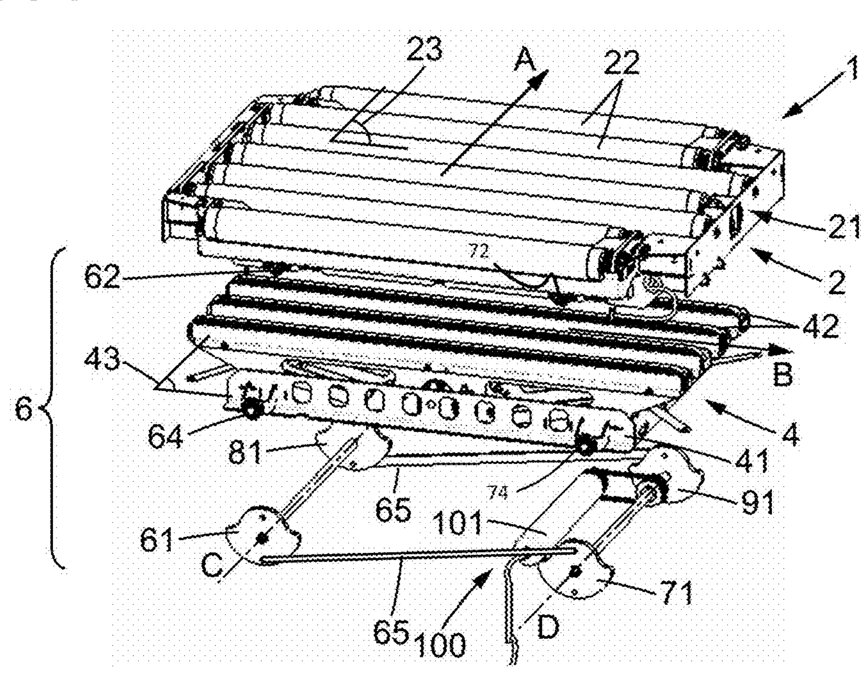
[Fig. 2]
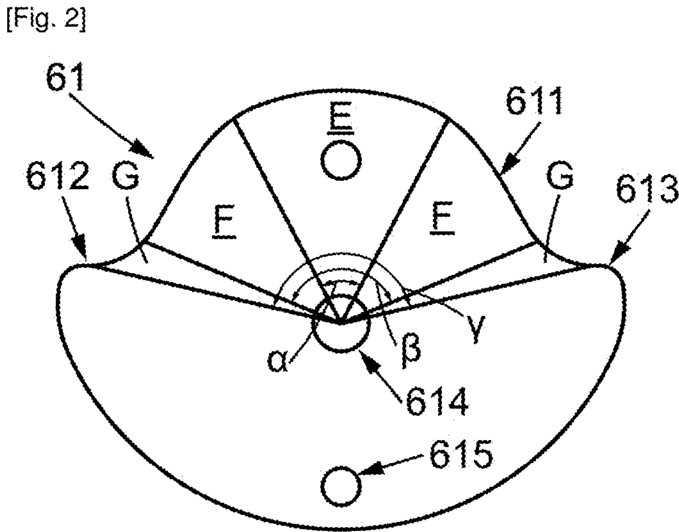

[Fig. 3]
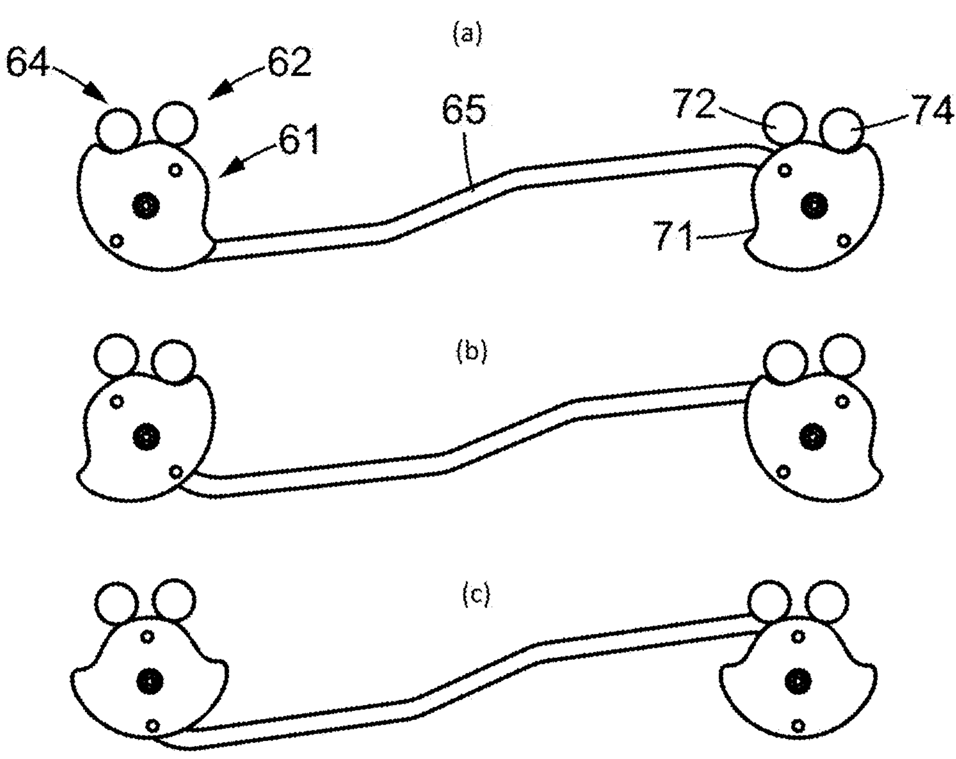
[Fig. 4]
41
21
211
64
62
61

[Fig. 5]
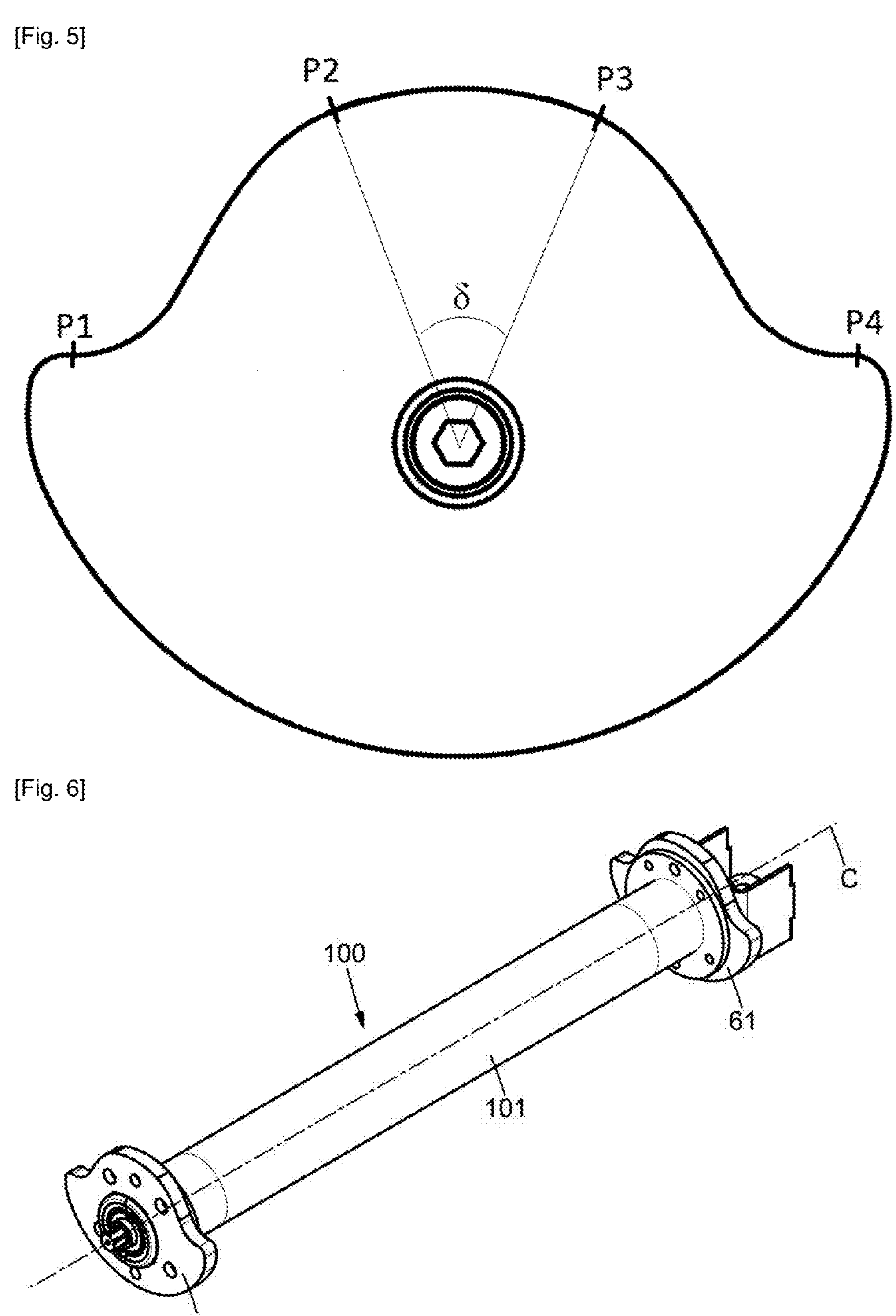
[Fig. 6]

TRANSFER TABLE

FIELD

The present disclosure relates to the technical field of automatic storage and retrieval systems (ASRS). These systems generally comprise a storage structure (warehouse) in which articles are stored in individual units or on appropriate supports (trays, pallets, etc.). Bringing and retrieving these articles to the storage warehouse is done by a series of conveyors and switches driven with a high degree of automation. Different types of conveyors are used, for example rollers, belts, chains, stacker cranes, robots. The main issues are related to speed and reliability of the handling and extraction of articles, but also the compactness of the system plus the assurance of not damaging the handled articles. In fact the potential sites for damages to articles include changes in direction, acceleration and slowing. This is the case for example with transfer tables, which are modules of conveyors with which to switch an article into a direction transverse to the main direction along which the article is conveyed.

BACKGROUND

The patent JP 6,140,467 B describes a transfer table adapted to execute a change of direction in a conveyor line. A plurality of conveyor rollers, separated from each other, form a set which is vertically mobile. The conveyor belt may be inserted between each adjacent pair of rollers. When an article transported by the rollers, in a first direction, must be redirected, the rollers drop and the belts rise in order to support the article and convey it in a direction perpendicular to this first direction.

The mechanism allowing raising and lowering rollers and belts comprises eight cams engaging with as many cam rollers. This design is heavy, uneconomical, bulky and complex. Also, this mechanism requires a precise alignment of the eight cams for managing the horizontality of the conveyors. These disadvantages become particularly problematic in a storage warehouse or in a conveyor line which may comprise a large number of this type of transfer table.

SUMMARY

The present disclosure makes it possible to respond to these problems, by proposing a more reliable design that is also simpler and therefore more economical and lighter weight.

A transfer table is proposed comprising: a first assembly comprising a first chassis bearing a plurality of first conveyor elements spaced from one another and defining a first plane for conveying articles; a second assembly comprising a second chassis bearing a plurality of second conveyor elements spaced from one another and defining a second plane for conveying articles; and a raising-lowering mechanism for the first and/or second assembly(ies), comprising a cam having a track and a pair of rollers engaging with the track of the cam, where a first roller of the pair of rollers is borne by the first chassis and a second roller of the pair of rollers is borne by the second chassis, and where the cam is mobile by pivoting between: a first position, in which the first plane is arranged above the second plane; and a second position, in which the second plane is arranged above the first plane.

The engagement of two cam rollers (rollers) belonging to two distinct kinematic assemblies with a same cam, and more precisely with the same cam track, serves to result in a raising-lowering mechanism which is more compact, simple, lightweight and reliable than known systems. While it can be advantageous to manipulate both assemblies, it is also possible to foresee that only one of the two conveyors is vertically mobile, as its movement alone will determine which of the two planes is above the other. In this case, the immobile conveyor will anyway be provided with a roller, even if that roller is foreseen to roll over a portion of cylindrical track ensuring to keep the conveyor vertically immobile. This system is versatile because a single replacement of the cam will suffice to change the immobile conveyor into a vertically mobile conveyor.

According to another aspect, the cam is a first cam and the pair of cam rollers is a first pair of rollers, wherein the raising-lowering mechanism comprises a second cam and a second pair of rollers, wherein a first roller of the second pair of rollers is borne by the first chassis and a second roller of the second pair of rollers is borne by the second chassis. These systems serve to obtain a precise positioning of the assemblies.

According to another aspect, the raising-lowering mechanism comprises a connecting rod joining the first cam to the second cam, wherein the connecting rod is attached by pivot to the first cam and to the second cam at respective points such that the movement of the cams operates in opposite directions.

According to another aspect, the raising-lowering mechanism comprises a connecting rod joining the first cam to the second cam, wherein the connecting rod is attached by pivot to the first cam and to the second cam at respective points such that the movement of the cams operates in identical directions.

The connecting rods provide simple and reliable synchronization of the movements of the various cams and therefore a reliable positioning of the height of the conveyor assembly.

According to another aspect, the track has one or two angular end-of-range stops. This makes it possible to precisely control the vertical movement of the conveyors without needing to use sensors, actuators and/or control loops.

According to another aspect, the first and second cams each comprise one or two angular end-of-range stops configured such that when one of the stops or the stop of the first cam engages a roller borne by the first chassis, respectively borne by the second chassis, one of the stops or the stop of the second cam simultaneously engages a roller borne by the first chassis, respectively borne by the second chassis. The presence of several stops serves to take up the forces or the lateral play in order to precisely hold the conveyors in the extreme positions.

According to another aspect, an electric motor is arranged coaxially with a pivoting axis of the (first) cam. This design is particularly compact.

According to another aspect the electric motor has an external rotor, where the (first) cam is formed on or attached to the external rotor.

Alternatively, the motor may be remote and joined to the cam by a drive belt or chain.

According to another aspect, the track comprises a so-called common portion on which both the first and second rollers roll as the cam pivots from the first position to the second position.

According to another aspect, the track has a curved length and the common portion extends over 10 to 30% of the curved length of the bearing track.

According to another aspect, the common portion extends over an angle of the track that is comprised between 10° and 60°.

According to another aspect, the transfer table further comprises a third cam and a fourth cam, as well as a third pair of cam rollers and a fourth pair of rollers, where the third and fourth cams and third and fourth pairs of rollers are arranged symmetrically to the first and second cams and first and second pairs of rollers, relative to a median plane of the transfer table. This configuration serves to manage particularly precisely the horizontality (or inclination, if such is desired) of the conveying planes.

According to another aspect, an angle travelled by the cam between the first position and the second position is comprised between 30 and 180°. Depending on the diameter of the cam and the diameters of the rollers, and the height travelled by the conveyors, the cam may be optimized in order to obtain a rapid change between the first and second conveyor assembly, while avoiding jolts.

According to another aspect, at least one of the first to fourth cams may be pivoted in a respective median angular position in which the first and second planes coincide. An angularly neutral position between the first and second position may also be provided. From this position, the first or second conveyor may be quickly selected for conveying the articles. The position of the cam in which the planes coincide may be the highest altitude position. This way the conveyed load is not translated vertically and the conveying plane is never changed.

The invention also relates to a method for transferring articles by means of the transfer table described above, where the method comprises: conveying an article by the first assembly, pivoting of the cam from the first position to the second position, and then conveying the article by the second assembly.

According to another aspect, the pivoting motion of the cam from the first position to the second position is done according to a first pivoting direction and the method further comprises a pivoting step of the cam from the second position to the first position being done in a second pivoting direction, opposite the first pivoting direction. Thus, and contrary to some known systems, there is no need to complete a full turn of the cam(s) in order to revert back to the first position.

BRIEF DESCRIPTION OF THE DRAWINGS

Other details and benefits will appear upon reading the following detailed description and the analysis of the attached drawings, on which:

FIG. 1 shows an exploded view of the transfer table according to an embodiment.

FIG. 2 shows a cam usable in the transfer table according to an embodiment.

FIG. 3 shows three angular positions of the cam and also the cam rollers.

FIG. 4 shows a detail of the chassis of the raising-lowering mechanism.

FIG. 5 displays the common portion of the cam path.

FIG. 6 shows a cam formed directly on the rotor of an electric motor.

DETAILED DESCRIPTION

FIG. 1 shows an exploded view of a transfer table 1 according to the invention. The transfer table 1 is made up of three main elements: a first conveyor assembly 2, a second conveyor assembly 4, and a raising-lowering mechanism 6 for the first and second assemblies 2, 4.

The first assembly 2 is a conveyor which transports articles (not shown) in the direction A. The second assembly 4 is a conveyor which transports articles (not shown) in the direction B. The direction B is not parallel to the direction A and may be perpendicular to the direction A.

The first assembly 2 comprises a first chassis 21 on which is laid out a plurality of first conveyor elements 22. In the example shown in FIG. 1, these elements are conveying rollers 22. Alternatively, these elements may be sections of conveyor bands, chains or belts, or any other equivalent conveyor type. At least one of the conveyor elements 22 may be motorized, by motor means borne by the chassis 21 or by remote motor means that are in kinematic connection with at least one of the elements 22. Alternatively, none of the elements 22 are motorized and the articles are conveyed by gravity or driven by external means while lying on the elements 22.

The elements 22 are arranged so as to allow a gap between at least some of them. This gap is sufficiently small to not hinder the proper conveyance of these conveyed articles along direction A.

As shown in FIG. 1, the rollers 22 may have varying lengths and/or diameters. They are however aligned in a plane 23 which is a plane on which the conveyed articles rest. The plane 23 may be horizontal or inclined.

The second assembly 4 comprises a second chassis 41 on which is arranged a plurality of second elements 42. In the example shown, the second elements are belts but other types of conveyor elements may be provided (chains, rollers, etc.). The second elements 42 may have the same length or varying lengths. For example, belts of different lengths could be used for pivoting the conveyed articles around a vertical axis in order to change the orientation thereof before and/or during transportation thereof. The second elements 42 are aligned to form a second conveying plane 43.

At least one of the conveyor elements 42 may be motorized, by motor means borne by the chassis 41 or by remote motor means that are in kinematic connection with at least one of the elements 42.

The first assembly 2 and the second assembly 4 are vertically mobile. Alternatively, as discussed below, only one of the two assemblies 2, 4 is vertically mobile. The respective gaps between the first elements 22 and the second elements 42 are such that the second elements 42 may pass through the gaps between the first elements 22, and the first elements 22 may pass through the gaps between the second elements. Thus, the articles are conveyed along the direction A when they rest on the plane 23 of the elements 22 or along the direction B when they rest on the plane 43 of the elements 42. In an absolute coordinate system, the planes 23 and 43 may occupy the same altitude at the time of the transition between the transportation of an article by the elements 22 and by the elements 42. This same altitude may be the maximum altitude which the planes 23, 43 can take during the vertical movement of the assemblies 2, 4. Alternatively, the assemblies 2, 4 may convey the articles at their respective different altitude.

The vertical movement of the first and second assemblies 2, 4 is achieved by a raising-lowering mechanism 6. This mechanism 6 comprises a cam 61 which engages with a pair of (cam) rollers 62, 64. One of the rollers 62 (i.e. first roller) is borne by the first chassis 21 and the second roller 64 is borne by the second chassis 41. These two rollers 62, 64 roll on a track (reference 611 on FIG. 2) of the cam 61. The cam 61 pivots around an axis C which is fixed in an absolute coordinate system. Thus, the pivoting motion of the cam 61 leads to the raising and lowering of the rollers 62 and 64. The axle of the rollers 62, 64 is fixed relative to the respective chassis 21, 41.

In an embodiment that is not shown, a single cam suffices for the vertical movement of the chassis 21, 41. It is in fact sufficient that one point to the chassis 21, 41 be raised/lowered so that the conveyor elements 22, 42 alternately play their part in conveying the articles along directions A or B. The planes 23 and 43 may in that way vary in inclination for conveying successively the articles. The planes 23 and 43 may also be kept horizontal by any suitable means, for example by passive actuators (sliders, springs, attitude compensators, etc.) or active actuators (inclination sensors, pistons, electric motors, etc.).

The raising-lowering mechanism 6 may comprise a second cam 71 pivoting around an axis D and followed by a second pair of rollers 72, 74, borne respectively by the first and second chassis 21, 41. The kinematics of the second cam 71 is identical to that of the first cam 61. The second cam 71 may pivot independently of the first cam 61 in order to adjust the altitude of two points of the chassis 21, 41 independently.

However, in the example shown in FIG. 1, both cams 61, 71 are joined by a connecting rod 65 such that their pivoting motion is synchronous. The track of the cams 61, 71 may be selected so that the altitudes of the respective rollers are different, in a preferred example, the tracks are such that the rollers 62, 72 of the first assembly 2 (respectively the rollers 64, 74 of the second assembly 4) are at the same altitude for any angular position of the cams 61, 71.

In the example shown, the connecting rod 65 is pivotally joined in distinct positions of the cams 61, 71. In particular, diametrically opposite points were here selected so that the pivoting motion of the two cams 61, 71 works in opposite directions. The pivot points may be brought closer to each other, meaning that in a median position (see FIG. 3(*c*)), the pivot points of the connecting rods are not vertically aligned with the center of the cams but angularly offset by the value comprised between 5° and 10°, for example about 8°. For the left cam, the offset is towards the right, and for the right cam it is towards the left.

The movement of the cams 61; 71 in opposite directions allows lateral forces which result from the weight of the assemblies 2, 4 applied on one cam to be compensated by the forces applied on the other cam. The cams are therefore under less stress.

In this case, the cams may be substantially symmetric. A slight phase offset, a function of the length of the connecting rod, of the distance between C and D, and of the radius of the attachment point of the connecting rod, may need to be taken under consideration. This phase offset has been determined to be negligible for the orders of magnitude of dimensions indicated below. In the opposite situation, i.e. if the phase offset is no longer calculated as being negligible, the tracks of the cams 61 and 71 should not be selected as being symmetric relative to one another.

According to an alternative design that is not shown, the connecting rod 65 is linked to the cams at identical points (on the respective cam, angularly and radially) and the two cams 61, 71 pivot in the same direction. In this case, the cams 61, 71 may be identical if it is desired that the altitude of the rollers be the same for all angular positions of the cams 61, 71.

The example shown in FIG. 1 also shows a third 81 and a fourth cam 91. These may be respectively connected in their pivoting motion with the first and second cams 61, 71 on the axes C and D. Alternatively, the third and fourth cams may be eccentric or even arranged at different altitudes. They may also be joined by a connecting rod 65. In the embodiment shown, the two connecting rods 65 are arranged in a way that ensures a pivoting motion of the cams 81 and 91 in opposite directions but by analogy with the preceding discussion, the connecting rod 65 joining the third and fourth cams 81, 91 could alternatively provide a movement of these cams 81, 91 in the same direction.

The cam 61, or at least one of the cams 61, 71, 81, 91 may be driven in a pivoting motion by an electric motor 100. The rotor 101 of the motor 100 may be connected to one cam or to one axle of the cams by any appropriate means (belt, chain, reduction gear or geartrain, etc.).

Thus, the general principle of operation of the transfer table 1 is as follows: an article coming from a conveyor that is not shown arrives on the transfer table 1. The article is conveyed in the direction A by the first assembly 2. The motor 100 is actuated for pivoting the one or more cams 61, 71, 81, 91 so that the plane 43 rises and then the plane 23 descends, where the elements 42 penetrate between the gaps separating the elements 22. The driving of the elements 22 may have stopped before or during raising the chassis 41. The motor 100 is stopped when the article which had rested on elements 22 now rests on the elements 42. The elements 42 are then moved for transporting the article in the direction B.

Once the article is cleared from the transfer table 1, the motor 100 may be engaged in the opposite direction for lowering the plane 43 back down and raising the plane 23.

The motor 100 may stop in a median or holding position, for example in which the planes 23 and 43 coincide.

Advantageously, as shown in FIG. 1, the various cams and the various rollers are identical. This serves to make the manufacturing, and final adjustments during assembly, logistics or maintenance easier. However, the invention is not limited to this configuration and the person skilled in the art will understand the variations can be made on the rollers or the cams without altering the ability of the system to properly function.

FIG. 2 shows in detail an example of a cam 61 which may be used in the transfer table 1.

The cam 61 has a (bearing or rolling) track 611 (or rolling ribbon 611) which is formed of a continuous surface without sharp angles. The rollers 62, 64 (cam followers) rest, because of their own weight and because of the weight of the assemblies 2, 4, on this track 611. The rollers 62, 64 roll principally without sliding on the track 611.

The track 611 may have a profile having a symmetry about the vertical axis Z from FIG. 2. The track 611 may be selected in order to get a specific kinematics in terms of vertical position, velocity and acceleration of each roller.

In the example shown, the track 611 may be divided into five zones. A central zone E may be characterized by a distance to the center of the cam which may be substantially constant, i.e. a circular arc. In a zone F, the track 611 gets closer to the center of the cam (when seen from the zone E). A cam roller in contact with the zone F will therefore provide a lower altitude to the corresponding chassis than a roller in contact with the zone E. Finally, a zone G constitutes a stop 612, 613 (or angular end-of-range stop) characterized by a sharp increase of the bearing track 611 distance from the center of the cam. A roller in contact with the stops 612, 613 blocks the pivoting motion of the cam. For example, the radius of curvature of the zones G may be less than the radius of the rollers. A significant slope in the zone G is another way to get a holding of the cam by the roller. The stop forms in some way a “wall” collinear to the pivoting axis of the cam 61 and tangent to the roller. That way, even a very large torque applied to the cam does not allow any vertical translation of the roller. The stops also offer a stable angular position of the cam and therefore a stable vertical position of the conveying assemblies. These stable positions guarantee an indexing of the position of the cam even in case of failure of the control of the motor.

In a variant design that is not shown, the cam 61 does not comprise a stop, or only comprises one.

The order of magnitude of the zones E, F and G can be illustrated by means of the angles $\alpha$, $\beta$ and $\gamma$. These may be respectively comprised in the following ranges: [5°;50°], [10°;150°] and [30°; 180°]. The angles are selected based on the kinematics intended for the assemblies 2 and 4 and/or based on the respective diameters of the cams and rollers, and or based on the desired speed of transitioning between the two different configurations of the transfer tables.

In an alternative design that is not shown, the cam is not symmetric. An asymmetry may for example be provided in the movement of the chassis 21, 41. For example, one of the chassis may have a smaller vertical travel or a different vertical displacement speed.

As an alternative, one of the two assemblies 2, 4 is vertically immobile and the cams are thus intended so that the cams corresponding to the immobile assembly roll over a portion of the track which is entirely cylindrical. The transfer table then functions like "pop-ups," meaning that the articles conveyed by the elements 22 are abruptly redirected from their trajectory by the elements 42 which may be pushers, which are interspersed between the elements 22. Such a system is flexible because it suffices to replace the cam that has a cylindrical portion which makes the corresponding assembly 2, 4 vertically immobile, with a cam as discussed above, to obtain a system where both assemblies are vertically mobile.

FIG. 2 also shows a central orifice 614 receiving a shaft for pivoting the cam around the axis C, and an offset orifice 615 which may be used for joining the connecting rod 65 to the cam 61.

FIG. 3 shows three distinct positions of the raising-lowering mechanism using cam 61 from FIG. 2. Position (a) shows the rollers 62, 72 of the first assembly in contact with the zone E of the respective cams 61, 71 whereas the rollers 64, 74 for the second assembly are stopped in contact with the zone G of the cams. This position corresponds to the "first position" described above, in which the plane 23 is above the plane 43. In this position, the articles are conveyed by the elements 22.

Position (b) is the "second position" discussed above, in which the plane 43 is above the plane 23. In fact, in this position, the rollers 62, 72 of the first assembly 2 are stopped in zone G of the cams whereas the rollers 64, 74 of the second assembly 4 are in contact with the zone E of the cams. In this position, the articles are conveyed by the elements 42.

The positions (a) and (b) show that the rollers 64, 74 or 62, 72 are simultaneously in contact with the stops of various cams, which allows an indexing of the position of the planes 23, 43 in mechanically stable positions, and serves to overcome imprecisions which could be linked to the imprecise control of the angular position of the electric motor.

In the example shown, the angular travel between the first position (a) and the second position (b) is such that, for example, the roller 61 passes from one end of the zone E to the end of the opposite zone G. This travel amounts to $(\alpha+\gamma)/2$ and is included between 3° and 180°. In this configuration, the zone E is a common portion, shared by the path of two rollers, as both of the rollers may roll at some point on this portion. The remainder of the path 611 (i.e. not the common portion E) is only visited by a single one of the two rollers. This configuration further improves the compactness of the raising-lowering mechanism.

While the example shown in FIG. 3 shows movements of cams in opposite directions during passage from one position to another, in an alternative embodiment that is not shown, the first cam 61 and the second cam 71 may pivot in the same direction.

Finally, the position (c) corresponds to a median position, in which the rollers are all at the same altitude, in contact with the zone E of the cams. In this position, the planes 23 and 43 coincide.

FIG. 3 also illustrates the fact that the connecting rod 65 may have a more or less complex shape and is not necessarily straight. The shape of the connecting rod 65 may in particular be selected for avoiding mechanical interference with other parts of the system or of neighboring systems during movement of the connecting rod.

The distance between the axes of the cams 61, 71 may be several tens of centimeters, for example between 20 cm (about 8 inches) and 200 cm (about 78 inches). The radius of the point at which the connecting rods are linked to the cams may be several tens of millimeters, for example between 20 mm (about 25/32 inches) and 80 mm (about 3 inches).

FIG. 4 shows a detail of the raising-lowering mechanism 6 in front view. If it is possible to provide rollers offset along the pivoting axis of the cam (C in FIG. 1), it may be advantageous, for the compactness of the system, that the rollers 62, 64 at least partially overlap in a plane perpendicular to the pivoting axis of the cam. For this purpose, the first chassis 21 may comprise a notch 211 which avoids mechanical interference between the first chassis 21 and the rollers 64 of the second chassis 41. The notch is sufficiently large to leave any movement of the roller 64 unrestricted.

FIG. 4 also demonstrates the fact that the rollers 62, 64 are offset from each other along a horizontal transverse direction perpendicular to the pivoting axis of the cam. The axis of rotation of the two rollers 62, 64 are typically parallel to the pivoting axis C of the cam 61 and may be arranged on either side of the pivoting axis C of the cam (or either side of the vertical axis Z passing through the center of the cam 61).

Such an offset allows a separation in phase between the rising/lowering of the two assemblies 2, 4 whereas the two rollers 62, 64 roll in temporal offset on a portion of the track common to the two rollers. In fact, the rollers 62 and 64 each travel a portion of the track 611 during pivoting of the cam 61 and a portion of the track is common to the travel of the two rollers. This aspect can also be seen in reference to FIG. 3 where the intermediate positions between the positions which are drawn can be easily imagined.

The common portion is identified in FIG. 5. It may be a central portion between the two end positions of the path 611, in particular between the two stops 612, 613. The track extends from point P1 to point P4. The length of the track is the curved distance between P1 and P4. The common portion extends from P2 to P3. The length thereof may represent between 10 and 30% of the length of the total curved length of the track 611. The angle formed by the common portion (8) may be included between 1° and 60°. This common portion may correspond to the zone referenced E on FIG. 2.

The rollers may be offset along the direction C and/or have a different width in the direction C. Thus, when the rollers only partially overlap in the plane perpendicular to C, the common portion may not be as large in the direction C as the width of the rollers.

While FIG. 1 shows a motor 100 indirectly driving the cams, FIG. 6 shows an alternative design in which the cam 61 may be formed directly on the rotor 101 of the motor. In this example, the motor 100 is an external rotor; it therefore has a shaft fixed with the axis C and a turning tubular body. The cam 61 may be attached or formed onto the rotor 101 or may be jointly molded therewith. The FIG. 6 also shows that the third cam 81 may be mounted on the same rotor 101. This solution further improves the compactness and simplicity of the transfer table.

LIST OF REFERENCE NUMBERS

1: Transfer table
100: electric motor
101: rotor of the electric motor
2: First conveyor assembly
21: Chassis of the first conveyor assembly
211: Notch in the first chassis
22: Conveyor elements of the first assembly
23: First conveying plane
4: Second conveyor assembly
41: Chassis of the second conveyor assembly
42: Conveyor elements of the second assembly
43: Second conveying plane
6: raising-lowering system
61: (first) cam
611: track of the cam 61
612: first angular end-of-range stop of track 611
613: second angular end-of-range stop of track 611
614: central orifice of the cam
615: offset orifice of the cam
62: first roller engaging with the cam 61
64: second roller engaging with the cam 61
71: second cam
72: first roller engaging with the cam 71
74: second roller engaging with the cam 71
81: third cam
91: fourth cam
A: direction of conveying the first assembly 2
B: direction of conveying the second assembly 4
C: pivoting axis of the first cam 61
D: pivoting axis of the second cam 71
E, F, G: zones du bearing track 611

The invention claimed is:

1. A transfer table comprising:

a first assembly comprising a first chassis bearing a plurality of first conveyor elements spaced from one another and defining a first plane for conveying articles;

a second assembly comprising a second chassis bearing a plurality of second conveyor elements spaced from one another and defining a second plane for conveying articles; and a raising-lowering mechanism for raising and lowering at least one of: the first assembly; and the second assembly, the raising-lowering mechanism comprising:

a first cam having a cam track; and a first pair of cam followers engaging with the cam track of the first cam, wherein a first cam follower of the first pair of cam followers is borne by the first chassis and a second cam follower of the first pair of cam followers is borne by the second chassis, and wherein the first cam is mobile by pivoting between:

a first position, in which the first plane is arranged above the second plane; and a second position, in which the second plane is arranged above the first plane, wherein the raising-lowering mechanism comprises a second cam and a second pair of cam followers, wherein a first cam follower of the second pair of cam followers is borne by the first chassis and a second cam follower of the second pair of cam followers is borne by the second chassis, wherein the transfer table comprises a third cam and a fourth cam, as well as a third pair of cam followers and a fourth pair of cam followers, wherein the third and fourth cams and the third and fourth pairs of cam followers are arranged symmetrically to the first and second cams and first and second pairs of cam followers, relative to a median plane of the transfer table.

2. The transfer table according to claim 1, wherein the raising-lowering mechanism comprises a connecting rod joining the first cam to the second cam, wherein the connecting rod is attached by pivot to the first cam and to the second cam at respective points such that the first and second cams move in opposite directions.

3. The transfer table according to claim 1, wherein the raising-lowering mechanism comprises a connecting rod joining the first cam to the second cam, wherein the connecting rod is attached by pivot to the first cam and to the second cam at respective points such that the first and second cams move in identical directions.

4. The transfer table according to claim 1, wherein the cam track has one or two angular end-of-range stops.

5. The transfer table according to claim 1, wherein the first cam and the second cam each comprises at least one end-of-range stop configured such that when one of the at least one angular end-of-range stops of the first cam engages the first cam follower of the first pair of cam followers, one of the at least one angular end-of-range stops of the second cam simultaneously engages the first cam follower of the second pair of cam followers.

6. The transfer table according to claim 1, wherein the first and second cams each comprises at least one end-of-range stop configured such that when one of the at least one angular end-of-range stops of the first cam engages the second cam follower of the first pair of cam followers, one of the at least one angular end-of-range stops of the second cam simultaneously engages the second cam follower of the second pair of cam followers.

7. The transfer table according to claim 1, further comprising an electric motor arranged coaxially with a pivoting axis of the first cam.

8. The transfer table according to claim 7, wherein the electric motor has an external rotor, wherein the first cam is formed on or attached to the external rotor.

9. The transfer table according to claim 1, wherein the cam track comprises a common portion on which the first cam follower as well as the second cam follower of the first pair of cam followers roll as the first cam pivots from the first position to the second position.

10. The transfer table according to claim 9, wherein the cam track has a curved length and the common portion extends over 10 to 30% of the curved length of the cam track.

11. The transfer table according to claim 9, wherein the common portion extends over an angle of the cam track comprised between 10° and 60°.

12. The transfer table according to claim 1, wherein an angle travelled by the first cam between the first position and the second position is comprised between 30° and 180°.

13. The transfer table according to claim 1, wherein the first cam, the second cam, the third cam and the fourth cam may be pivoted in a median angular position in which the first and second planes coincide.

14. A method for transferring articles, the method comprising:

providing a transfer table comprising:

a first assembly comprising a first chassis bearing a plurality of first conveyor elements spaced from one another and defining a first plane for conveying articles;

a second assembly comprising a second chassis bearing a plurality of second conveyor elements spaced from one another and defining a second plane for conveying articles; and a raising-lowering mechanism for raising and lowering at least one of: the first assembly; and the second assembly, the raising-lowering mechanism comprising:

a first cam having a cam track; and a first pair of cam followers engaging with the cam track of the first cam, wherein a first cam follower of the first pair of cam followers is borne by the first chassis and a second cam follower of the first pair of cam followers is borne by the second chassis, and wherein the first cam is mobile by pivoting between:

a first position, in which the first plane is arranged above the second plane; and a second position, in which the second plane is arranged above the first plane, wherein the raising-lowering mechanism comprises a second cam and a second pair of cam followers, wherein a first cam follower of the second pair of cam followers is borne by the first chassis and a second cam follower of the second pair of cam followers is borne by the second chassis, wherein the transfer table further comprises a third cam and a fourth cam, as well as a third pair of cam followers and a fourth pair of cam followers, wherein the third and fourth cams and the third and fourth pairs of cam followers are arranged symmetrically to the first and second cams and first and second pairs of cam followers, relative to a median plane of the transfer table;

conveying an article by the first assembly;

pivoting the first cam from the first position to the second position; and then conveying the article by the second assembly.

15. The method according to claim 14, wherein pivoting the first cam from the first position to the second position comprises pivoting the first cam in a first pivoting direction, and the method further comprises pivoting the first cam from the second position to the first position in a second pivoting direction, the second pivoting direction being opposite the first pivoting direction.

* * * * *